Oct. 11, 1938.  H. FORD ET AL  2,132,728
TRANSMISSION
Filed Jan. 2, 1936  4 Sheets-Sheet 1

INVENTORS.
Henry Ford
H W Simpson
A O Roberts
BY
ATTORNEY.

W. Colwin C. McRae.

Oct. 11, 1938.  H. FORD ET AL  2,132,728
TRANSMISSION
Filed Jan. 2, 1936  4 Sheets-Sheet 2

INVENTORS.
Henry Ford.
H. W. Simpson.
BY Q. O. Roberts.
ATTORNEY.

W.
Colvin C. McRae

Oct. 11, 1938.   H. FORD ET AL   2,132,728
TRANSMISSION
Filed Jan. 2, 1936   4 Sheets-Sheet 3

INVENTORS.
Henry Ford
H. W. Simpson
BY A. O. Roberts

ATTORNEY.

W.
Edwin C. McRae.

Oct. 11, 1938.  H. FORD ET AL  2,132,728
TRANSMISSION
Filed Jan. 2, 1936  4 Sheets-Sheet 4

INVENTORS.
Henry Ford.
H W Simpson.
BY A O Roberts
Edwin C. McRae.
ATTORNEY.

Patented Oct. 11, 1938

2,132,728

UNITED STATES PATENT OFFICE 2,132,728

TRANSMISSION

Henry Ford, Howard W. Simpson, and Albert O. Roberts, Dearborn, Mich., assignors to Ford Motor Company, Dearborn, Mich., a corporation of Delaware Application January 2, 1936, Serial No. 57,200

3 Claims. (Cl. 74—260)

The object of our invention is to provide a transmission especially adapted for use in a motor vehicle, which transmission provides two forward and one reverse speed ratios between the engine and the drive shaft. A novel feature of our improved transmission is that both of the forward speed ratios are engaged automatically while the reverse speed is manually engaged.

A further object of our invention is to provide a transmission which is connected to the motor by means of an automatic clutch and wherein means are provided for locking this clutch in its disengaged position so that the engine may be operated entirely independent of the transmission, if desired. This is particularly desirable in cold weather in order to rapidly warm up the motor before starting the car.

Still a further object of our invention is to provide manually operable means whereby the transmission may be locked in its low speed position, the purpose of which is to allow the engine to be used as a brake in descending hills. Heretofore, all automatic transmissions with which the applicant is familiar were incapable of transmitting torque from the drive shaft to the motor in any but a direct drive. When descending hills with such transmissions, the automatic clutch shifts the device into direct drive so that the motor is ineffective as a brake. In our improved transmission the motor may be effectively used as a brake at any time, means being provided to lock the transmission in low gear for this purpose.

Still a further object of our invention is to provide a power cylinder which is operated by the vacuum from the intake manifold of the associated engine for applying the low speed brake band. This cylinder is interconnected with the governor which shifts the transmission, in such manner that the cylinder vacuum is relieved just before the governor shifts the transmission into direct drive. Consequently, under every condition of load and speed, the low speed gearing is released an instant before the direct drive is engaged. No jerk or simultaneous operation of the two speeds results under any condition.

With these and other objects in view our invention consists in the arrangement, construction and combination of the various parts of our improved device as described in the specification, claimed in our claims and illustrated in the accompanying drawings, in which:

Figures 1, 9:
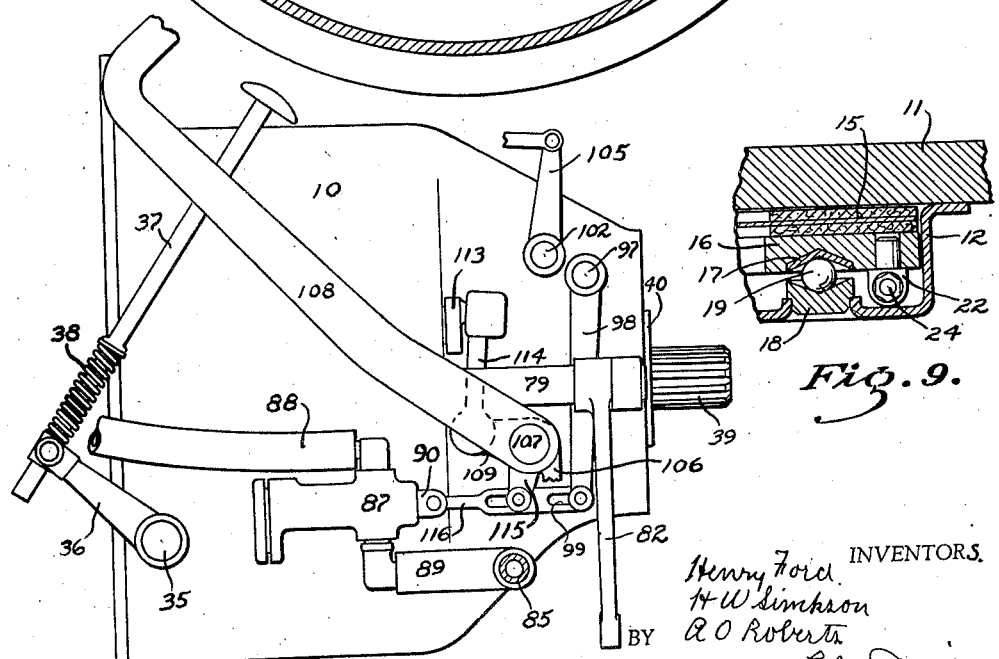
Figure 1 is a side elevation of our improved transmission, showing the external control members associated therewith.
Figure 9 is a sectional view, taken on the line 9—9 of Figure 4, showing the means whereby the engine clutch is engaged upon the actuation of engine clutch governor weights.

Referring to the accompanying drawings, we have used the reference numeral 10 to indicate the housing which encloses our transmission, which housing is adapted to be secured to the associated engine in the conventional manner. This engine is provided with a conventional flywheel 11 to the rear face of which is secured a sheet metal clutch housing 12, this housing enclosing a unit composed of governor weights, a friction disc and a pressure plate. A shaft 13 is rotatably mounted upon the axis of the flywheel 11 and extends rearwardly substantially through the transmission housing. That portion of the shaft 13 lying within the clutch housing 12 is splined, as at 14, to receive a friction disc 15, and a pressure plate 16 is mounted in the housing in alignment with this disc 15. The pressure plate is supported in the housing 12 by means of three ball supports. Three ball receiving inserts 17 are equally spaced around the periphery of the plate 16 and other ball receiving inserts 18 are secured in the housing 12 in substantial alignment therewith. A ball 19 is interposed between each pair of inserts 17 and 18. In the free position of the clutch, as shown in Figure 9, clearance is provided between the plate 16 and the disc 15 so that the clutch is disengaged when in such position. However, circumferential movement of the plate 16 relative to the housing 12 will cause the balls 19 to ride up upon the inclined edges of the inserts 17 and 18, thereby forcing the plate 16 towards the flywheel so as to grip the disc 15 between this plate and the flywheel 11. Governor weights are provided for causing this rotative movement of the pressure plate.

Three governor weights 20 are pivotally mounted upon pins 21 which extend inwardly from the housing 12, these weights being spaced circumferentially around the housing. The weights 20 swing outwardly in the conventional manner upon rotation of the housing 12. Anchor pins 22 are fixed in the pressure plate 16 and a compression spring 23 extends between each pin 22 and the outer portion of the adjacent weight 20 so that the weights are resiliently urged inwardly. The springs 23 are guided by bolts 24 which prevent the springs from flying outward due to centrifugal force. Tension springs 25 connect the outer ends of the weights 20 and assist the compression spring 23 in urging the weights 20 to their innermost positions. The restraining force exerted by the springs 25 is self-contained; that is, no reaction is taken on any clutch member, while the force exerted by the springs 23 reacts against the pressure plate 16. By varying the relative strengths of the springs 23 and 25 the desired resistance to outward movement of the weights 20 may be obtained, together with the desired torsional applying force upon the pressure plate 16.

The flywheel rotates in the direction shown by arrow 26 from which it will be seen that the engaging movement of the pressure plate 16 in this case is in the same direction relative to the housing 12 to engage the clutch. A very gradual engagement of the clutch is thereby effected for the reason that friction or drag upon the plate 16 tends to force the weights 20 inwardly. This drag is resisted by the centrifugal force of the weights so that the frictional pressure is gradually built up sufficient to drive the car.

Figure 4:
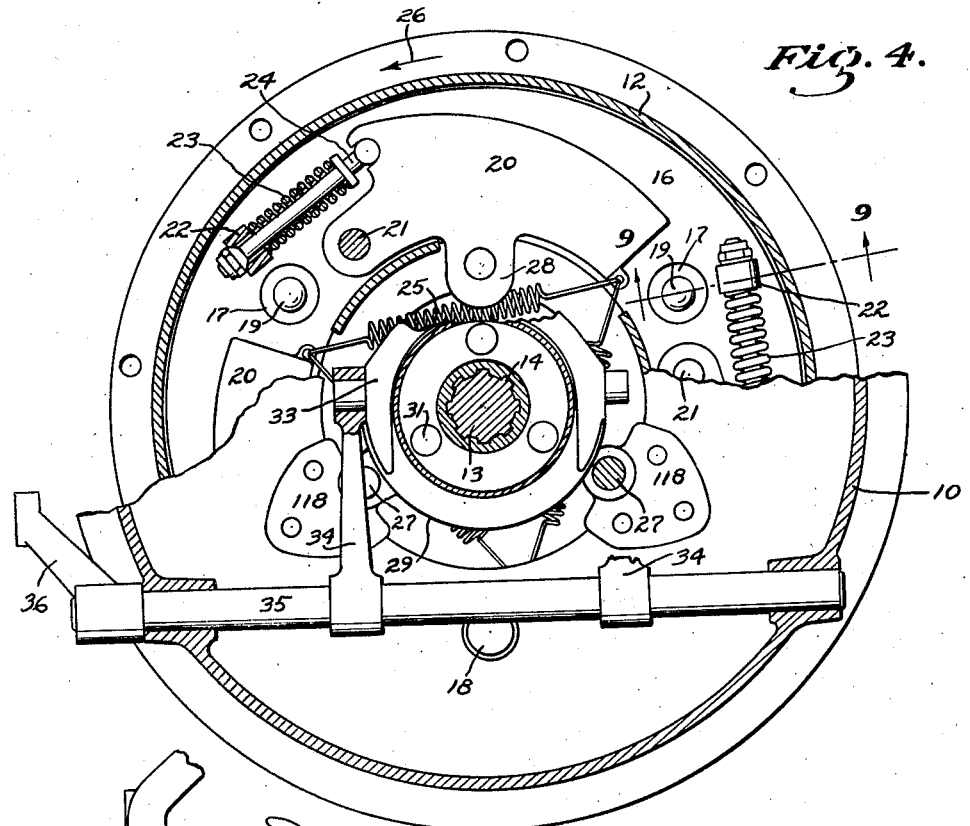
Figure 4 is a sectional view, taken on the line 4—4 of Figure 3, illustrating the automatic engine clutch, the novel feature therein being the means for manually holding this clutch in its inoperative position.
Figure 3:
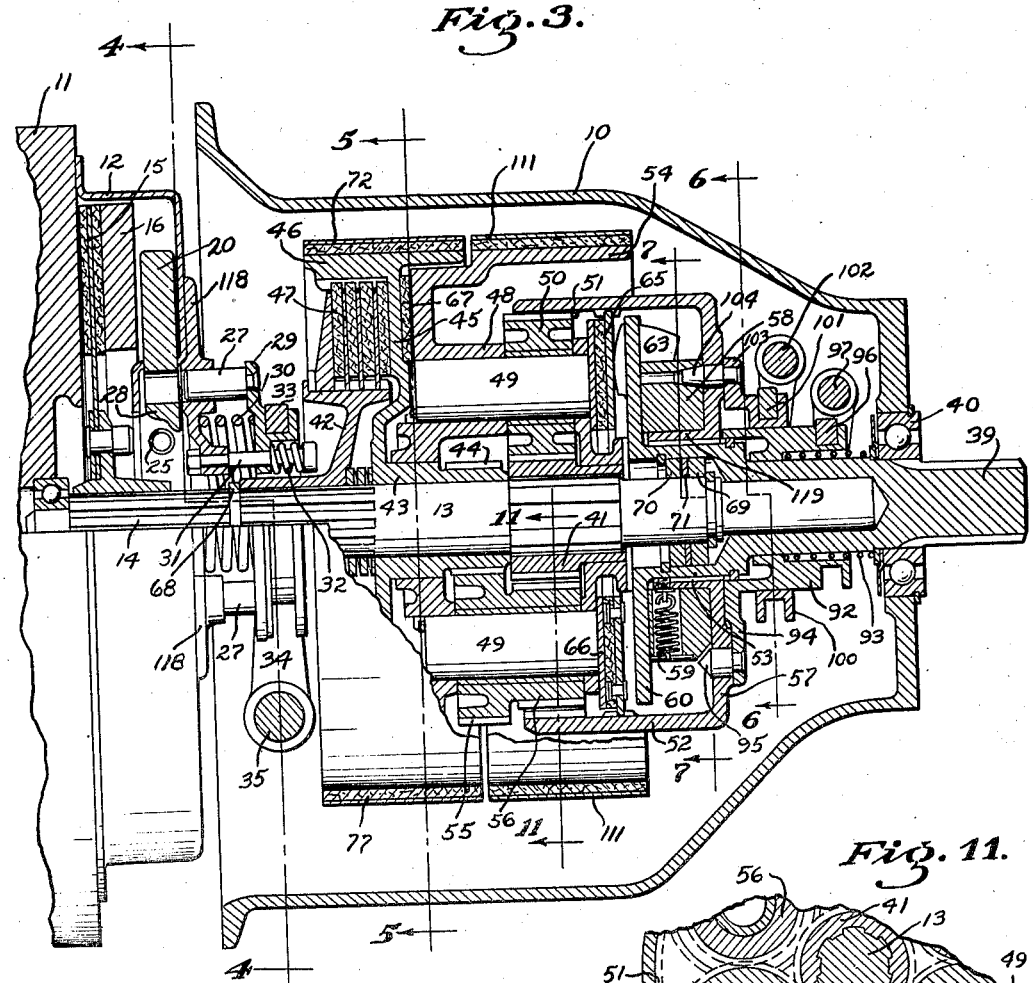
Figure 3 is a sectional view, taken on the line 3—3 of Figure 2.

Figures 3 and 4 show means for manually locking the aforementioned engine clutch in its inoperative position, so that the engine may be operated at any speed without causing engagement of this clutch. Three brackets 118 are secured to the housing 12, each of these brackets having a pin 27 reciprocally mounted therein so as to move axially therein. An ear 28 extends inwardly from each of the weights 20 in each of which ears an opening is provided in alignment with the adjacent pin 27 when the weight is in its innermost position. The outer end of each of the pins 27 is secured to a collar 29 so that upon shifting the collar 29 the three pins 27 are simultaneously reciprocated. A compression spring 30 is interposed between the brackets 118 and the collar 29 to resiliently urge the pins to their outermost position at all times. Limiting studs 31 extend from the brackets 118 through the collar 29 and springs 32 are inserted between the studs and collar to limit the outward movement of the collar. The collar 29 is provided with an annular groove therein in which a yoke 33 is disposed, this yoke being pivotally secured to the free ends of a pair of arms 34, the opposite ends of which arms are fixedly secured to a shaft 35. The shaft 35 extends transversely through the transmission housing 10 where an operating lever 36 is fixed thereto. Oscillation of the lever 36 thus reciprocates the yoke 33 to thereby simultaneously reciprocate the pins 27 into and out of engagement with the openings in the ears 28. A plunger 37 is connected to the free end of the lever 36 through a compression spring 38, the upper end of this plunger extending through the floor boards of the car and being accessible to the driver of the vehicle.

If the driver desires to operate the motor independently of the automatic engine clutch, he depresses the plunger 37 which urges the lever 36 downwardly through the compression spring 38 thereby tending to force the pins 27 inwardly. If the engine is stationary or idling then the pins readily enter the openings in the ears 28 to thereby prevent the weights from moving outwardly due to centrifugal force. If, however, the weights are already in an outward position, due to the speed of the motor, then the pins will not engage the weights and the spring 38 will simply be compressed until the engine slows down to idling speed, or until the plunger is released. However, when once the pins have entered the openings in the weights and the motor speed has increased, the operator may release the pressure from the plunger and the pins will still remain engaged due to the friction of the weights upon the pins.

Referring to Figure 3 of the accompanying drawings, it will be seen that the shaft 13 extends rearwardly from the flywheel 11 where it is rotatably mounted in an axial bore in a driven shaft 39. The shaft 39 is rotatably mounted upon ball bearings 40 in the rear face of the housing 10. A sun gear 41 is splined to the intermediate portion of the shaft 13, and a clutch hub 42 is splined to this shaft just rearwardly of the engine clutch. A sleeve 43 is rotatively mounted upon the shaft between the gear 41 and clutch member 42, this sleeve having a low speed sun gear 44 formed integral therewith adjacent to the gear 41. A web 45 extends radially from the inner end of the sleeve 43 which web terminates in a low speed brake drum 46. A plurality of clutch plates 47 are interposed between the clutch hub 42 and the drum 46 each alternate plate being secured to the hub member with the intermediate plate splined to the drum. The parts are so arranged that, when the hub member 42 and the web 45 are moved axially towards each other the plates 47 will engage to thereby frictionally connect the members 42 and 45 to effect a direct drive through gearing which will subsequently be described.

Figure 8:
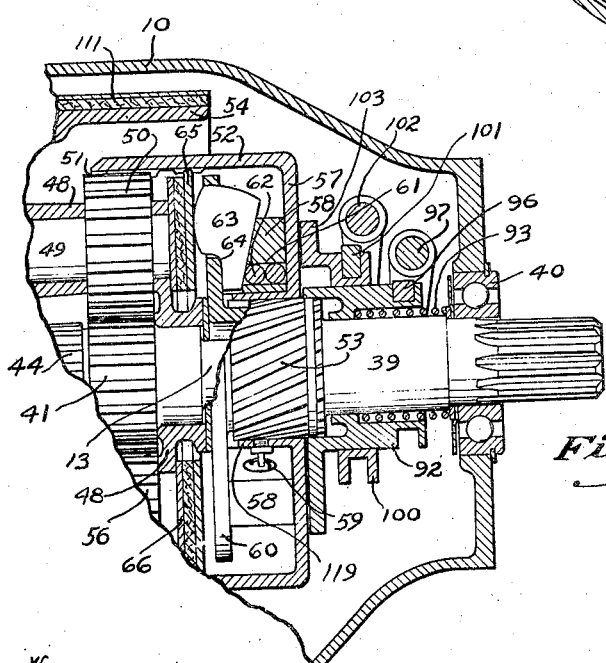
Figure 8 is a vertical central sectional view, taken on the line 8—8 of Figure 7, illustrating the operation of the transmission speed and torque responsive governor.

It will be noted that a planet carrier 48 has one end rotatably mounted upon the sleeve 43 while the opposite end is rotatively mounted upon the hub member of the sun gear 41. Six axially aligned pins 49 extend through the planet carrier 48, each alternate pin having a reverse speed planet pinion 50 rotatably mounted thereon in mesh with the sun gear 41. A reverse speed brake drum 54 is formed integrally with the carrier 48. An internal gear 51 is machined in a cylindrical member 52, which internal gear is in mesh with each of the pinions 50. The member 52 is provided with a web 57 which connects it with a hub member 119 which is splined upon the driven shaft 39 by means of a left hand spiral spline 53, as shown in Figure 8. This spiral spline functions as a torque controlling member, as will later be described. However, for the present, it may be sufficient to say that the member 52 is at all times splined to the driven shaft 39 so that when the former is rotated the final drive will be obtained through the shaft 39.

Figure 11:
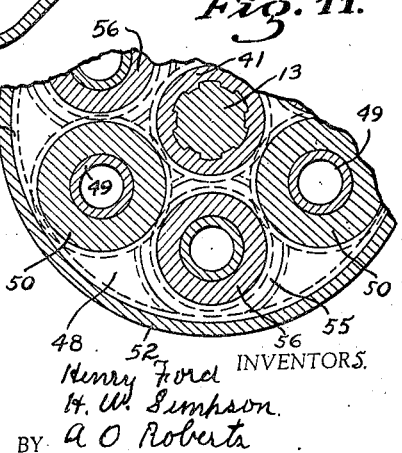
Figure 11 is a sectional view, taken on the line 11—11 of Figure 3.
Figure 6:
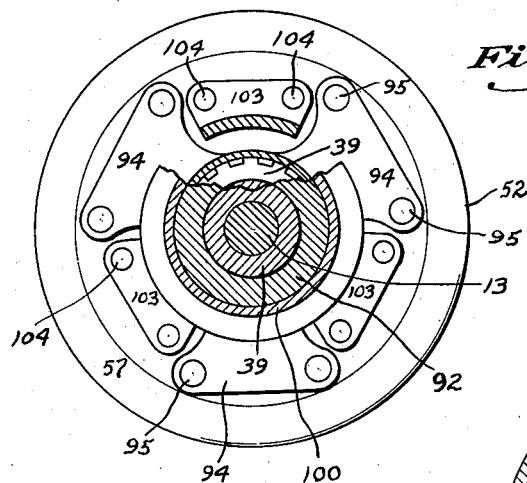
Figure 6 is a sectional view, taken on the line 6—6 of Figure 3, this view illustrating the means for manually holding the transmission governor weights in their inoperative positions together with the means provided for relieving the vacuum operated in the low speed power cylinder upon the movement of the governor weights to their direct drive positions.

Referring to the low speed gearing, it will be noted that the three remaining pins 49 each have a cluster gear unit rotatably mounted thereon, each of these cluster gears being composed of a large pinion 55 which is formed integrally with a smaller pinion 56. Each of the pinions 55 is in mesh with the low speed sun gear 44, while the gears 56 are axially aligned with the reverse speed sun gear 41 but do not mesh with either. The gears 56 mesh with each adjacent reverse speed pinion 50, as shown in Figure 11, to thereby establish a gear train from the low speed sun gear 44 through the cluster pinions 55 and 56, then through the reverse planets 50 to the sun gear 41 and to the internal gear 51.

From the foregoing, it will be seen that upon rotation of the drive shaft 13, the planet carrier 48 being held stationary, a drive is obtained from the sun gear 41 through the planet gears 50 to the ring gear 51, to thereby drive the ring gear at substantially one-third engine speed in a reverse direction, the low speed gear 44 being driven in a reverse direction at slightly greater than engine speed.

When neither of the brake drums are held from rotation, the internal gear 51 remains stationary with the planet carrier 48 advancing forwardly at substantially one fourth engine speed, and the low speed gear 44 rotating in a reverse direction, at slightly less than engine speed. This is the neutral position.

The low speed drive is, of course, in a forward direction and is effected by holding the low speed sun gear 44 stationary by means of the drum 46 while driving the sun gear 41. In this case the planet carrier 48 is rotated in a forward direction faster than required in neutral. The gear 44 being stationary causes the planet carrier 48 to revolve forwardly around the gear 44 due to the rotation of the cluster gears. This forward movement of the carrier causes the forward movement of the internal gear at a reduced speed.

No claim is made herein to novelty in the specific gearing employed, this gearing having been described only to disclose a workable transmission.

Figure 7:
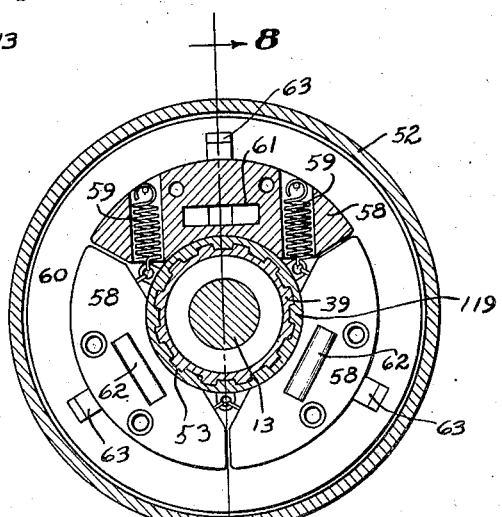
Figure 7 is a sectional view, taken on the line 7—7 of Figure 3, illustrating the arrangement of the transmission governor weights.

Referring to Figures 3, 7 and 8, it will be noted that a disc 60 is formed integrally with the inner end of the driven shaft 39, which disc extends substantially to the periphery of the internal gear. member 52. A considerable axial space exists between the disc 60 and web 57 in which space three segment shaped governor weights 58 are disposed. These weights surround the hub 119, each weight having a pair of openings therethrough in which springs 59 are disposed, one end of each of these springs is secured to the hub 119 while the other ends are secured to the periphery of the respective weights. The weights are thus resiliently urged inwardly against the hub member 119 at all times.

A transverse slot 61 extends through each of the weights 58 in which slot a pair of rollers 62 are disposed. A radial slot is provided in the inner face of each of the weights 58 so as to intersect the slots 61, and a finger 63 is freely mounted in each of these radial slots. The bottom of the radial slot in each of the weights is angularly disposed to correspond to an angle on the adjacent finger 63. The fingers 63 project through suitable radial apertures in the disc 60, each of these fingers being adapted to fulcrum around a point 64 on this disc.

From the foregoing it will be noted that, when the weights 58 are moved outwardly, the rollers 62 roll outwardly between the web 57 and the inclined edges of the fingers 63 to thereby rock these fingers around the fulcrum 64. The opposite edges of these fingers are thus pushed forwardly. The fulcrum point 64 is disposed a substantial radial distance beyond the innermost positions of the rollers 62 so that the initial radial movement of the weights 58 does not tend to oscillate the fingers but simply moves the hub 119 axially along the spline 53. However, upon further radial movement of the weights, the upper ends of the fingers 63 are rocked forwardly and, by means which will subsequently be described, thus effect the direct drive of the transmission.

A clutch plate 65 is splined to the inside of the member 52 to which plate a friction lining is secured, while a second plate 66 is fixed to the adjacent face of the planet carrier 48. The plate 65 is so disposed that, when the fingers 63 are rocked forwardly pressure is applied upon the plate 65 which pressure is transmitted to the planet carrier 48 through the friction disc, just described. The pressure applied to the planet carrier 48 is transmitted through a friction disc 67 which is interposed between the carrier 48 and the web 57 to the hub member 42. The hub member 42 is fixed against axial movement relative to the shaft 13 by means of a snap ring 68 so that the aforementioned axial thrust is resisted directly by the shaft 13. A ring 69 is secured to the shaft 13 in substantial alignment with the centrifugal weights 58, while a similar ring 70 is fixed to the shaft 39 in a like manner. A thrust washer 71 is interposed between the rings 69 and 70 so that forward thrust upon the shaft 13 will be transmitted to the shaft 39 through the thrust washer 71. Thus, all axial thrust produced by the fingers 63 in effecting the direct drive is self-contained within the device and as all of the parts through which the thrust is carried rotate at the same speed, no wear results from this load. The main transmission bearings do not resist thrust from this source at any time.

As has been previously mentioned, the shaft 39 is provided with a spiral spline 53 upon which the hub member 119 is reciprocally mounted. In this installation the spline is machined in a left hand direction and at substantially a 30 degree angle. The purpose of the spiral spline is to resist the axial movement of the hub 119, according to the torque thereon and thus vary the speed at which the weights 58 start to move outwardly due to centrifugal force. When no torque load is applied to the driven shaft 39, the weights 58 move outwardly at a comparatively low rotative speed, being resisted only by the springs 59. As has been mentioned before, the weights 58 may move outwardly to the fulcrum point 64, but the hub 119 must have been moved rearwardly upon the splines 53 a substantial distance. When the hub is transmitting little or no torque this rearward movement requires little extra force to be accomplished. However, when a comparatively high torque is being transmitted, a much higher rotative speed is required in order that the weights 58 will develop sufficient centrifugal force to move the hub against the axial thrust produced by the spiral splines. Thus, the car speed at which the transmission is shifted from low speed to direct drive varies according to the load being carried. A lighter torque load will cause the shift to be accomplished at a lower car speed, while a higher torque load causes the shift to be made at a higher speed.

It is essential that the low speed drum be released when the direct drive is engaged in order that no shock will be produced in the driving mechanism and that no loss of power will result due to the application of the two speeds at the same time. Means will now be described whereby the initial movement of the weights 58 disengages the low speed effecting means just before the transmission is shifted to direct drive.

Figure 5:
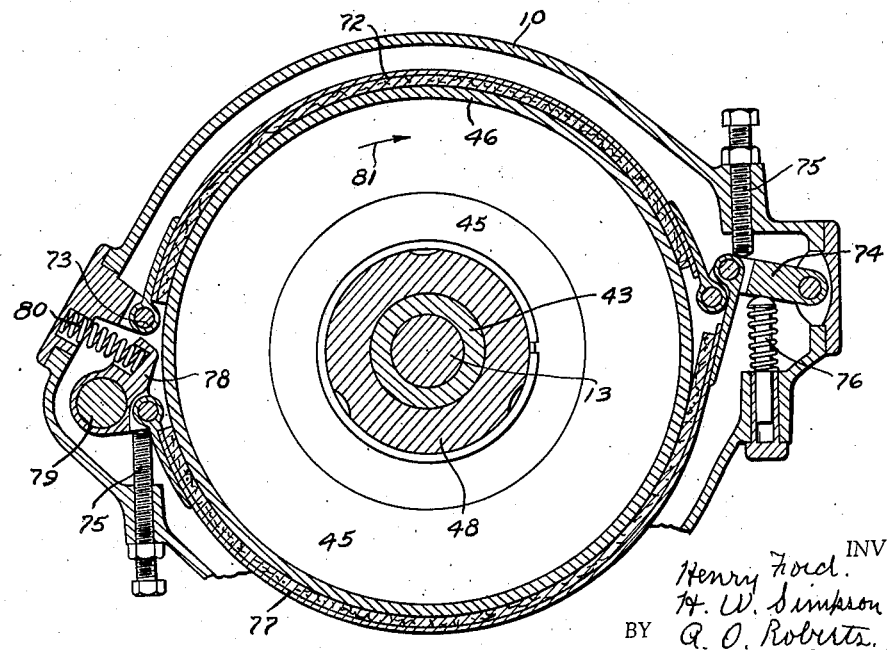
Figure 5 is a sectional view, taken on the line 5—5 of Figure 3, illustrating the brake bands which are used to hold the low speed drum from rotation.

Referring to Figure 5, it will be noted that we have shown a low speed effecting brake band which comprises a half circular band 72 which is anchored at one end by a pin 73, the other end of this band being pivotally secured to an arm 74, which in turn is pivotally secured to the housing 10. An adjusting screw 75 is threaded into the housing in position to coact with the arm 74 so that the screw may be adjusted to maintain a minimum but definite clearance between the band 72 and the adjacent drum 46 when the band is released. A spring urged plunger 76 is reciprocally mounted in the housing 10 in position to urge the arm 74 against the screw 75 to thereby maintain this clearance. A half circular band 77 has one end anchored upon the free end of the arm 74, adjacent to its connection with the band 72, while the other end of the band 77 is secured to an operating arm 78, which arm extends radially from a shaft 79, the latter being rotatably mounted in the housing 10 and extending parallel to the axis of the transmission. A second adjusting screw 75 is threaded in the housing 10 in position to coact with the arm 78 and maintain a definite clearance between the drum 46 and the band 77 when the band is in its released position. A compression spring 80 resiliently urges the arm 78 to its released position and thereby maintains the desired clearance.

The drum 46 rotates in the direction shown by arrow 81 in Figure 5 when in neutral. Consequently, the two bands 72 and 77 function as a single energized band when engaged with the drum. It will be apparent that an actuating movement of the arm 78 first engages the band 77 with the drum and then draws the arm 74 downwardly against the plunger 76 until the band 72 is engaged. Thus a continuous band is provided around the drum and, as the application of the applying force is in the direction of normal rotation of the drum, an energized brake is obtained. This band is believed to differ from the conventional transmission band in that a definite clearance is established between each half of the band and the drum when released so that no drag is produced in neutral or direct drive.

Figure 2:
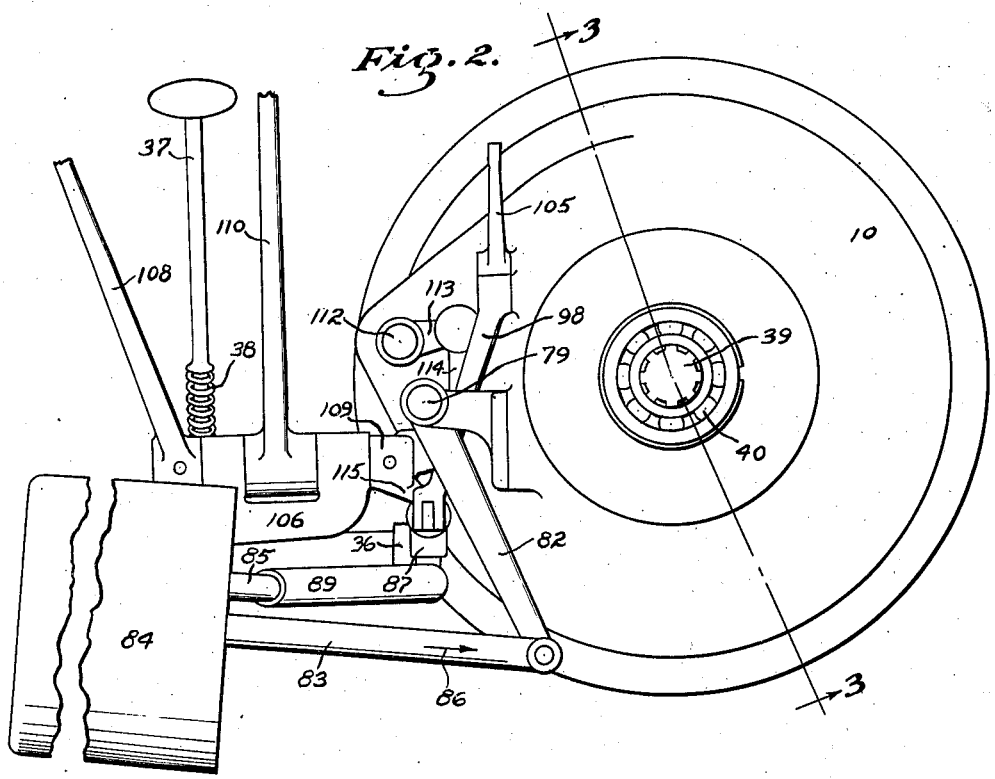
Figure 2 is an end view of the transmission which is shown in Figure 1.

Referring to Figures 1 and 2, it will be noted that a lever 82 extends downwardly from the outer end of the shaft 79 and that this lever is pivotally connected to a plunger 83, which plunger is connected to a piston which is disposed in a vacuum operated cylinder 84. The cylinder 84 is provided with an inlet 85, the cylinder being arranged that, when a source of vacuum is connected to the inlet 85, the plunger 83 will be drawn in the direction of arrow 86 to thereby oscillate the lever 82 in a counterclockwise direction, thereby applying the brake bands 72 and 77 and thus locking the transmission in the low gear position.

A valve housing 87 is fixedly secured to the housing 10. A flexible tube 88 connects one port of the valve 87 with the intake manifold of the associated engine, while a second flexible conduit 89 connects a second port of the valve with the intake pipe 85. A plunger 90 is reciprocally mounted in the valve and is resiliently urged by a spring 91 to position such that a passageway is established between the tubes 88 and 89. However, when the plunger 90 is pulled outwardly the intake manifold port is closed and the tube 89 opened to atmospheric pressure to thereby relieve the vacuum in the cylinder 84 and thus release the brake band around the low speed drum 46. A link 116 extends rearwardly from the plunger 90.

Means will now be described whereby an initial radial movement of the governor weights 58 operates the plunger 90 to thereby control the actuation of the low speed effecting band. A sleeve 92 is reciprocally mounted upon the shaft 39 between the bearings 40 and the spline 53, this sleeve being resiliently urged in a forward direction by means of a compression spring 93. Three arms 94 project radially from the forward end of the sleeve 92 and in the outer end of each of these arms a pair of pins 95 are fixed, which pins extend through suitable openings in the web 57 so as to project therethrough just beyond the peripheries of the weights 58. The projecting ends of the pins 95 are beveled, as are the adjacent portions of the weights 58, so that when the weights 58 move radially any appreciable distance, the pins 95 are pushed rearwardly to thus move the sleeve 92 a corresponding amount. An annular groove is provided in the rear portion of the sleeve 92 in which groove a yoke 96 is mounted. This yoke is pivotally secured to a shaft 97 in the same manner that the yoke 33 is secured to the shaft 35 so that when the sleeve 92 is moved rearwardly, the shaft 97 will be oscillated. A lever 98 is secured to the free end of the shaft 97 which lever extends downwardly to position adjacent to the plunger 90, the free end thereof being connected to this plunger by a pin and slot connection 99 in the link 116. The lever 98 normally is in a position wherein the plunger 90 allows the vacuum to be impressed upon the low speed operating cylinder. However, when the weights 58 are moved radially to a position wherein the rollers 62 are aligned with the fulcrum 64, the arm 98 will have moved the plunger 90 to position wherein the cylinder 84 is opened to atmospheric pressure to thereby release the low speed band. Thus, the low speed band is always released before the fingers 63 are oscillated around the fulcrum 64 to provide the direct drive.

It is very desirable to be able to use the engine as a brake when descending hills and in order to do this, it is necessary that means be provided for locking the transmission in low gear, irrespective of the speed of the car. To do this we have provided a collar 100 which is reciprocally mounted upon the sleeve 92, which collar is provided with an annular groove therein in which a yoke 101 is disposed. The yoke 101 is connected to an operating shaft 102 which shaft is rotatably mounted in the housing 10 in a transverse position. The yoke is connected to the shaft in a manner similar to the connection provided for the two previously mentioned yokes 96 and 33. Three ears 103 project radially from the collar 100 and in each of these ears a pair of pins 104 are secured, these pins extending through the web 57 in which they are reciprocally mounted. The inner ends of the pins 104 are tapered inwardly and each of the weights 58 is provided with a pair of tapered openings therein which are located in such position that when the weights 58 are in their innermost positions the collar 100 may be pushed forwardly, the pins 104 entering the tapered openings in the weights. When the collar 100 is in its forward position, the weights 58 will be prevented from moving outwardly irrespective of the speed of rotation so that the transmission will remain in low gear. Due to the taper on the pins 104 it is possible to move the pins out of engagement with the weights when the drive shaft 39 is rotating at a comparatively high speed, the friction on the pins being counteracted by the taper thereof. The taper on the pins is, however, sufficiently slight that the pins will remain in their engaged positions unless moved by the operator to their released positions.

An arm 105 is secured to one end of the shaft 102, which arm is connected to a button on the instrument panel of the vehicle by means of a conventional flexible control, whereby the pins 104 may be engaged or disengaged at will by the operator. It will, of course, be apparent that the pins 104 cannot be engaged while the device is operating in direct drive; however, as soon as the transmission slows down to its low speed position, then the pins may be engaged to retain the transmission in low speed irrespective of the speed of the engine.

The purpose of the above mentioned device is, of course, to provide a means whereby the engine may be used as a brake in descending hills.

Referring to Figures 1 and 2, it will be noted that we have provided a bracket 106 which is fixed to the vehicle frame and in which bracket a shaft 107 is rotatably mounted. A reverse speed pedal 108 is fixed to one end of the shaft 107 while an arm 109 is fixed to the other end of the shaft. A brake pedal 110 is pivotally mounted upon the intermediate portion of the shaft.

A reverse speed effecting brake band 111 is mounted in the housing 10 around the reverse speed brake drum 54, which band 111 is similar to the low speed brake band previously described and which is actuated by a shaft 112, this shaft projecting rearwardly from the housing 10 in position parallel to the shaft 79. An arm 113 is fixed to the projecting end of the shaft 112, the free end of the arm 113 being connected to the free end of the arm 109 by means of a link 114. Thus, when the pedal 108 is depressed the shaft 112 is rotated to apply the reverse speed brake band. In order that the reverse speed band may never be applied while the low speed band is engaged, a second arm 115 is formed integrally with the arm 109, which arm 115 extends to position adjacent to the valve 87. The arm 115 is connected to the link 116 by an elongated slot and pin connection 117. Thus, when the pedal 108 is depressed not only is the shaft 112 rotated to apply the reverse speed brake bands but also the plunger 90 is moved outwardly to thereby relieve the vacuum in the cylinder 84 and thus release the low speed brake bands. Due to the slot 99 the position of the lever 98 is not affected by the operation of the reverse pedal. Similarly, due to the slot 117, the reverse speed pedal is not actuated upon movement of the link 116 due to the action of the governor weights 58.

Figure 10:
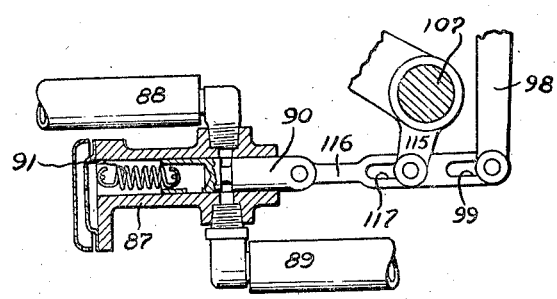
Figure 10 is a vertical central sectional view, through the valve which connects the low speed operating cylinder with the intake manifold of the engine.

The operation of our device is as follows:

The driver starts the engine in the usual manner and if he desires to speed up the motor in order to warm up same he presses the plunger 37 which locks the engine clutch in its disengaged position to thereby allow the motor to run freely at any speed not only until the plunger is released but also until engine speed is lowered to idling speed. When the motor has become warmed up and the plunger 37 is released, the operator may, if he desires to go forward, accelerate the motor to a point above 700 R. P. M. at which time the engine clutch engages. The plunger 90 during this period is in the position shown in Figure 10 so that the low speed brake band has been applied during the warm up period of the engine. Consequently, when the engine clutch engages the car will immediately start in a forward direction at a reduced speed. When a speed of from 15 to 25 miles per hour is reached, depending upon the torque being delivered by the motor, the governor weights 58 move outwardly to thereby apply the direct drive clutch. The low speed brake band will have been released due to the action of the governor weights upon the pins 95 so that the device now functions in direct drive. If it is desired to use the engine as a brake in direct drive nothing need further be done. However, if an exceptionally steep hill is being descended it may be desirable to use the engine as a brake with the transmission in low gear. To do this the car is slowed down to below 15 miles per hour and the pins 104 engaged with the weights 58. The engine will then be retained in its low speed gear ratio irrespective of the speed of the car.

If the operator desires to operate in reverse speed, the pedal 108 may be depressed at any time without causing damage to the transmission. If the car is standing still and the reverse speed pedal is depressed, the low speed band is simultaneously disconnected. If the reverse speed pedal is pressed while the car is in direct drive, it simply acts as a brake until the car slows down to approximately 15 miles per hour at which time the direct drive clutch disengages, the torque then being applied to reverse the driven shaft 39 through the aforementioned gearing.

Although the transmission shown herein provides only two forward and one reverse speed, our improvements are applicable to three speed transmissions and it is our desire to claim the improvements without reference to the specific transmission in which they are incorporated.

Among the many advantages arising from the use of our improved transmission, it may be well to mention that there are no jaw clutch teeth which operate to effect any of the speed ratios. Consequently, clashing of such teeth under all conditions is eliminated.

Still further, the means for effecting the low speed gear ratio is interconnected with the direct drive so that the low speed ratio is always disconnected when the direct drive is obtained. The conventional overrunning clutch heretofore provided for this purpose is thereby eliminated so that a much more reliable transmission is provided than where the conventional overrunning clutch is incorporated.

Some changes may be made in the arrangement, construction and combination of the various parts of our improved device without departing from the spirit of our invention, and it is our intention to cover by our claims, such changes as may be reasonably included within the scope thereof.

We claim as our invention:

1. A transmission comprising, driving and driven shafts, a planetary reduction gearing having a low speed brake drum which when held from rotation effects a reduced speed gear connection between said shafts, vacuum operated means for normally holding said drum from rotation, a friction clutch engageably connecting said shafts, centrifugally operated weights mounted in said transmission for rotation with said driven shaft, and means actuated by the outward movement of said weights for progressively relieving said vacuum and then engaging said clutch.

2. A transmission comprising, driving and driven shafts, planetary gearing connecting said shafts, a low speed brake drum associated with said planetary gearing which is adapted to be held from rotation to effect a reduced speed forward gear ratio between said shafts, a reverse speed drum associated with said gearing which is adapted to be held from rotation to effect a reverse speed gear ratio between said shafts, vacuum operated means for holding said low speed drum from rotation, manually operated means for holding said reverse speed drum from rotation, a centrifugally operated clutch adapted to clamp said brake drums together to effect a direct drive between said shafts, a valve adapted to control the vacuum in said low speed drum holding means, and means connecting said valve with both said reverse speed drum holding means and with said centrifugal clutch whereby engagement of either the reverse speed gear ratio or the direct drive will relieve the vacuum from said low speed holding means.

3. A transmission comprising, driving and driven shafts, planetary gearing connecting said shafts, low and reverse speed brake drums associated with said transmission which when held from rotation effect respectively a low and reverse speed gear ratio between said shafts, vacuum operated means for holding said low speed drum from rotation, manually operated means for holding said reverse speed drum from rotation, a direct drive clutch, and means connecting said direct drive clutch and reverse speed operating means with said vacuum holding means whereby actuation of either the reverse speed or the direct drive will render said low speed inoperative.

HENRY FORD.
HOWARD W. SIMPSON.
ALBERT O. ROBERTS.